G. BERRY.
APPARATUS FOR USE IN THE DISTRIBUTION OF ELECTRIC CURRENTS.
APPLICATION FILED MAY 6, 1911.
1,009,636.  Patented Nov. 21, 1911.
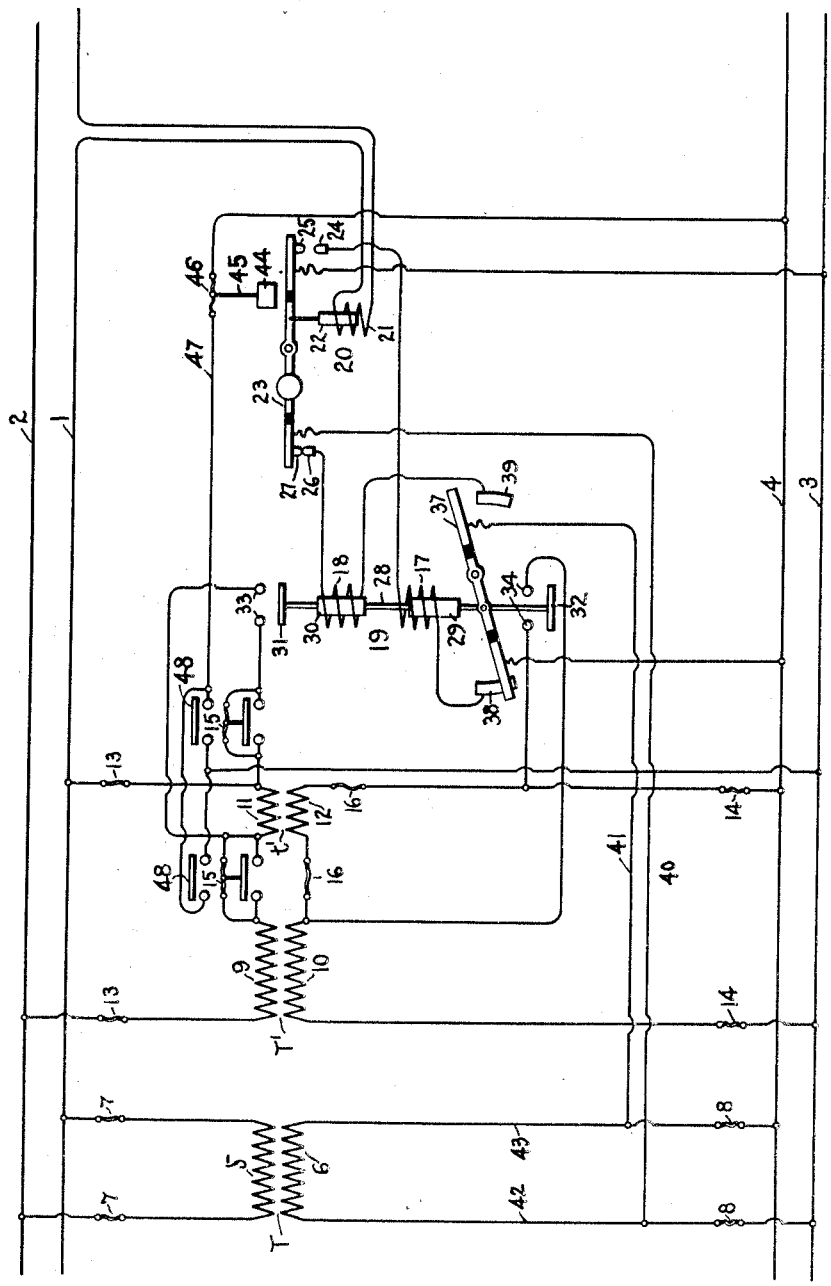
Witnesses:
Inventor
George Berry,
by
His Attorney

UNITED STATES PATENT OFFICE.

GEORGE BERRY, OF WEST DRAYTON, ENGLAND, ASSIGNOR TO GENERAL ELECTRIC COMPANY, A CORPORATION OF NEW YORK.

APPARATUS FOR USE IN THE DISTRIBUTION OF ELECTRIC CURRENTS.

1,009,636.  Specification of Letters Patent.  Patented Nov. 21, 1911.

Application filed May 6, 1911. Serial No. 625,508.

*To all whom it may concern:*

Be it known that I, GEORGE BERRY, a subject of the King of Great Britain, residing at Colne Mead, town of West Drayton, county of Middlesex, England, have invented certain new and useful Improvements in Apparatus for Use in the Distribution of Electric Currents, of which the following is a specification.

My invention relates to apparatus for use in the distribution of electric currents wherein two transformers, namely, a main transformer and a spare transformer, with an auxiliary transformer, connected in series with the spare transformer, are connected in parallel across a system, and has for its object an improvement in such devices.

It has been proposed in the past to connect a main transformer, with its primary and secondary windings connected across supply and distributing mains, in parallel with a spare transformer having its primary and secondary windings connected in series respectively with the similar windings of a small auxiliary transformer, these windings connected in series being connected in parallel to those of the main transformer across the mains, and, by the use of a double acting electromagnetic device having two windings in operative relation with a relay subject to the load on the system to short circuit the windings of the supplementary transformer when the load exceeds a predetermined value and to open the short circuits and put the spare transformer out of effective use when the load falls below a predetermined value, the circuit of each winding, after being closed at one point by the relay, being again immediately opened at another point by a switch operated from a movable part of the electromagnetic device or the switch mechanism. Heretofore, the two windings of the electromagnetic device have been arranged to be connected by the relay directly across the secondary mains with the result that should the main transformer fail while the spare transformer is out of effective use, that is to say, during times of low load, the spare transformer which would then be brought into use by the automatic short circuiting of the supplementary transformer windings, due to the momentary increase of current through the relay, due to the failure of the main transformer, would afterward, owing to low load conditions still prevailing, be liable to be automatically put out of use by the action of the relay and electromagnetic device, and thus cut off the supply of electric energy to the secondary circuit. Such an arrangement therefore necessitates the presence of an attendant at the transforming and distributing point or station to prevent this happening.

The object of my invention is to prevent the switch mechanism after acting automatically to short circuit the supplementary transformer upon failure of the main transformer, during time of low load, from being afterward automatically moved into a position to open the short circuit upon the relay, reassuming the position corresponding to low load. I accomplish this object by an especial arrangement of connections whereby the circuit for the electromagnetic device adapted to open the short circuits about the windings of the supplementary transformers will be opened or rendered non-effective upon failure of the main transformer.

The further novelties of my invention are pointed out with more particularity in the claims appended to and forming a part of this specification.

For a further understanding of my invention, reference may be had to the accompanying drawing which shows diagrammatically the arrangement of connections which I may employ.

1 and 2 are the primary supply mains connected to a suitable source of electric energy that has not been shown.

3 and 4 are the secondary distributing mains supplying suitable transforming devices which also have not been shown. The main transformer T has its primary winding 5 and secondary winding 6 connected respectively across the supply and the distributing mains, respectively through circuit opening devices or fuses 7, 8.

9 and 10 are the primary and secondary windings of the spare transformer $T^1$ connected in series respectively with the primary and secondary windings 11 and 12 of the small supplementary transformer $t'$ and respectively across the supply and distributing mains.

13 and 14 are the fuses for the primary and secondary windings respectively of the spare transformer, and 15 and 16 the fuses for the primary and secondary windings respectively of the supplementary transformer.

17 and 18 are respectively the opening and closing windings of electromagnetic device 19, these windings being controlled by a relay 20 of the kind described in the specification of British Letters Patent No. 2096 of 1904, and comprising a winding 21 connected in series with the primary main 1 and having its core or armature 22 connected to a loaded lever 23 adapted to close the circuit of winding 17 through fixed and movable contacts 24 and 25 and of winding 18 through the fixed and movable contacts 26 and 27.

The electromagnetic device shown is of the kind described in the specification of British Letters Patent No. 8927 of 1905 and comprises a movable core 28 carrying armatures 29, 30 and the movable contacts 31 and 32 of high and low tension switches respectively arranged to co-act with the corresponding fixed contacts 33 and 34 of these switches, and a supplementary switch comprising a movable contact 37 in the form of a lever fastened to the core 28 so as to be operated therefrom and fixed contacts 38, 39 connected to one end of the windings 17 and 18 respectively, the other ends of these windings being respectively connected to the relay contacts 24 and 26. In this arrangement, according to the invention the relay lever 23 and the switch lever 37 are respectively connected by conductors 40 and 41 to the conductors 42 and 43 by which the secondary winding 6 of the main transformer T is connected to the secondary mains, the points of connection between the conductors 40, 42 and 41, 43 being between the said secondary winding 6 and the fuses 8 therefor. The levers 23 and 37 are also connected directly to the distributing mains 3 and 4. Fuses 7 and 8 for the main transformer are weaker than those, 13, 14, for the spare transformer, or they are time fuses adapted to act in less time than those for the spare transformer.

By the arrangement described, it will be seen that should the main transformer T fail, the relay will be operated by the temporary increase of current in the supply mains 1, 2 to cause the relay lever 23 to close the circuit of winding 17 across the distributing mains 3, 4, energize the closing winding of the electromagnetic device and cause it to close the high and low tension switches 31—33 and 32—34, therefore short circuiting the supplementary transformer windings 11, 12 and bringing the spare transformer windings 9, 10 into effective use to supply the distributing mains 3, 4. Upon the current in the supply mains afterward falling below the predetermined value at which the supplementary transformer is under normal conditions open circuited, it will be seen that although the circuit of the winding 18 will be closed between contacts 26, 27 and contacts 37, 39, the said winding cannot be energized to operate the switch mechanism to open the short circuit and put the spare transformer out of effective use, because the main transformer, owing to its failure and the blowing of one or the other of its fuses, cannot supply current to the said winding.

Means, such as a weight 44, supported by a thread 45 carried by fuse wire 46 in a circuit 47 that can be closed by one or the other of two suspended circuit closing bars 48 controlled by the fuses 15 connected to the primary winding 11 of the supplementary transformer, are or may be provided as described in the said former specification of British Letters Patent No. 2096 of 1904 for causing the relay lever 23 to automatically move into a position to cause the switch mechanism to short circuit the supplementary transformer windings and keep them short circuited should either of the said fuses or the supplementary transformer windings 11, 12 fail.

While I have described a preferred embodiment of my invention, I do not limit myself to this embodiment, but seek in the appended claims to cover all embodiments which shall be obvious to those skilled in the art and not depart from the spirit of my invention.

What I claim as new and desire to secure by Letters Patent of the United States, is,—

1. In an alternating current distribution system, supply and distributing mains, a main transformer having its windings connected across these conductors, a spare transformer, and a supplementary transformer, the primary and secondary windings of said transformers normally connected respectively in series and across said mains, an electromagnetic device having windings adapted when energized to short circuit and open circuit the windings of the supplementary transformer, a relay in operative relation with the windings of said device, and means in operative relation with the relay causing the opening winding of said device to be rendered non-effective upon failure of the main transformer.

2. In an alternating current distribution system, supply and distributing mains, a main transformer having its primary winding connected across the supply mains, connections between the secondary winding of said transformer and the distributing mains, a spare transformer, and a supplementary transformer, the primary and secondary windings of said transformers normally connected respectively in series and across said mains, an electromagnetic device having windings adapted when energized to short circuit and open circuit the windings of the supplementary transformer, a relay in operative relation with said windings, and connections between the relay and the conductors connecting the secondary winding of the main transformer and the distributing mains adapted to render inoperative the opening winding of the electromagnetic device upon failure of the main transformer.

3. In an alternating current distribution system, supply and distributing mains, a main transformer having its primary winding connected across the supply mains, connections between the secondary winding of said transformer and the distributing mains, circuit opening devices in series with said conductors, a spare transformer, and a supplementary transformer, the primary and secondary windings of said transformers normally connected respectively in series and across said mains, an electromagnetic device having closing and opening windings adapted when energized to short circuit and open circuit the windings of the supplementary transformer, connections for energizing the closing winding from the secondary mains, connections for energizing the opening winding from the conductors connecting the distributing mains and the secondary winding of the main transformer intermediate its terminals and the circuit opening devices, and a relay in operative relation with said connections and the windings of the electromagnetic devices adapted when the load exceeds a predetermined value to complete the circuit for the closing winding of said device and when the load falls below a predetermined value to complete the circuit for the opening winding.

In witness whereof, I have hereunto set my hand this twenty-fifth day of April, 1911.

GEORGE BERRY.

Witnesses:
J. C. WRIST,
MAURICE A. V. LONDON.